(12) United States Patent
Ince et al.

(10) Patent No.: US 8,733,589 B2
(45) Date of Patent: May 27, 2014

(54) POLYMER DELIVERY SYSTEM AND METHOD FOR WASTE WATER FACILITY

(75) Inventors: Josh Ince, Grand Valley (CA); Paul Winsor, Mississauga (CA)

(73) Assignee: Klenzoid Company Limited, Mississauga (CA)

(*) Notice: Subject to any disclaimer, the term of this patent is extended or adjusted under 35 U.S.C. 154(b) by 496 days.

(21) Appl. No.: 12/760,137

(22) Filed: Apr. 14, 2010

(65) Prior Publication Data
US 2010/0264096 A1  Oct. 21, 2010

(30) Foreign Application Priority Data
Apr. 15, 2009 (CA) .................................... 2662490

(51) Int. Cl.
*B67D 7/06* (2010.01)

(52) U.S. Cl.
USPC ............... 222/23; 222/64; 222/373; 222/399; 141/83

(58) Field of Classification Search
USPC ............. 366/142, 177.1, 181.8, 182.2, 182.4; 222/145.5, 145.6, 399, 23, 64, 373, 222/394; 141/83
See application file for complete search history.

(56) References Cited

U.S. PATENT DOCUMENTS

| | | | | |
|---|---|---|---|---|
| 1,461,960 A * | 7/1923 | Bastian | .......................... | 222/173 |
| 2,107,986 A * | 2/1938 | Jenkins et al. | ................... | 62/399 |
| 3,039,654 A * | 6/1962 | Lopatka et al. | .................. | 222/23 |
| RE25,879 E * | 10/1965 | Rhodes et al. | ........... | 222/402.16 |
| 3,231,150 A * | 1/1966 | Holm et al. | .................... | 222/355 |
| 3,280,857 A * | 10/1966 | De Grave, Jr. et al. | .......... | 141/21 |
| 3,306,382 A * | 2/1967 | Espenschied et al. | ........ | 177/117 |
| 3,456,847 A * | 7/1969 | Scott | ................................. | 222/95 |
| 3,650,434 A * | 3/1972 | Johnson et al. | .................. | 222/31 |
| 3,807,701 A * | 4/1974 | Reid et al. | ...................... | 366/132 |
| 4,057,223 A | 11/1977 | Rosenberger | | |
| 4,233,265 A * | 11/1980 | Gasper | .......................... | 422/135 |
| 4,642,222 A | 2/1987 | Brazelton | | |
| 4,664,528 A | 5/1987 | Rodgers et al. | | |
| 4,705,182 A * | 11/1987 | Newel-Lewis | ................ | 215/230 |
| 4,769,154 A * | 9/1988 | Saylor et al. | ................... | 210/707 |
| 4,952,066 A | 8/1990 | Hoffland | | |
| 4,966,310 A * | 10/1990 | Hawkins | ........................ | 222/105 |
| 5,141,131 A * | 8/1992 | Miller et al. | ..................... | 222/54 |
| 5,372,421 A * | 12/1994 | Pardikes | ........................ | 366/137 |
| 5,427,125 A * | 6/1995 | Meza | ............................ | 134/95.3 |
| 5,470,150 A | 11/1995 | Pardikes | | |
| 5,547,331 A * | 8/1996 | Podd et al. | ..................... | 414/808 |
| 6,313,198 B1 | 11/2001 | Ho et al. | | |
| 6,384,109 B1 | 5/2002 | Witecki, Jr. | | |
| 6,779,685 B2 * | 8/2004 | Nelson | ................................ | 222/1 |
| 6,789,699 B2 * | 9/2004 | Clark et al. | ..................... | 222/94 |

(Continued)

*Primary Examiner* — David Sorkin
*Assistant Examiner* — Abbas Rashid
(74) *Attorney, Agent, or Firm* — Lipsitz & McAllister, LLC

(57) ABSTRACT

Systems and methods for activating polymer within a water treatment facility. The system includes a polymer makedown unit for blending and mixing diluent and polymer, the makedown unit including a polymer pump and a back pressure regulator operatively connected to the polymer pump. The system further includes a source of polymer including a sealed storage container for the polymer capable of being pressurized with compressed gas. The container includes a chamber for storing polymer under pressure, the container being capable of being pressurized by compressed gas, and an outlet for outputting pressurized polymer to the polymer makedown unit. There may also be provided a desiccant filter connected by a pressurized gas line for providing dry compressed gas into the container.

6 Claims, 4 Drawing Sheets

(56) References Cited

U.S. PATENT DOCUMENTS

| | | |
|---|---|---|
| 6,846,407 B2 * | 1/2005 | Anderson et al. .......... 210/167.3 |
| 6,884,867 B2 | 4/2005 | Pardikes |
| 6,916,114 B2 * | 7/2005 | Verkerk .......................... 506/33 |
| 6,978,671 B1 | 12/2005 | Meggs et al. |
| 6,997,347 B2 * | 2/2006 | Peng et al. ........................ 222/3 |
| 7,168,596 B2 * | 1/2007 | Delbarre .................... 222/400.7 |
| 7,178,974 B1 * | 2/2007 | Bell .............................. 366/145 |
| 7,578,416 B2 * | 8/2009 | Underwood ................. 222/190 |
| 7,752,974 B2 * | 7/2010 | Wenaas et al. ................ 102/367 |
| 7,931,174 B2 * | 4/2011 | Finlay et al. .................. 222/394 |
| 2001/0032504 A1 | 10/2001 | Moseley |
| 2002/0047021 A1 * | 4/2002 | Blacker et al. .................. 222/23 |
| 2003/0047178 A1 | 3/2003 | Barth et al. |
| 2003/0128626 A1 * | 7/2003 | Verkerk ....................... 366/140 |
| 2003/0194379 A1 * | 10/2003 | Brugger et al. ................ 424/45 |
| 2004/0035297 A1 * | 2/2004 | Mathues ........................ 99/275 |
| 2007/0272768 A1 * | 11/2007 | Williams et al. ............. 239/373 |
| 2008/0314807 A1 * | 12/2008 | Junghanns et al. ............. 210/85 |

* cited by examiner

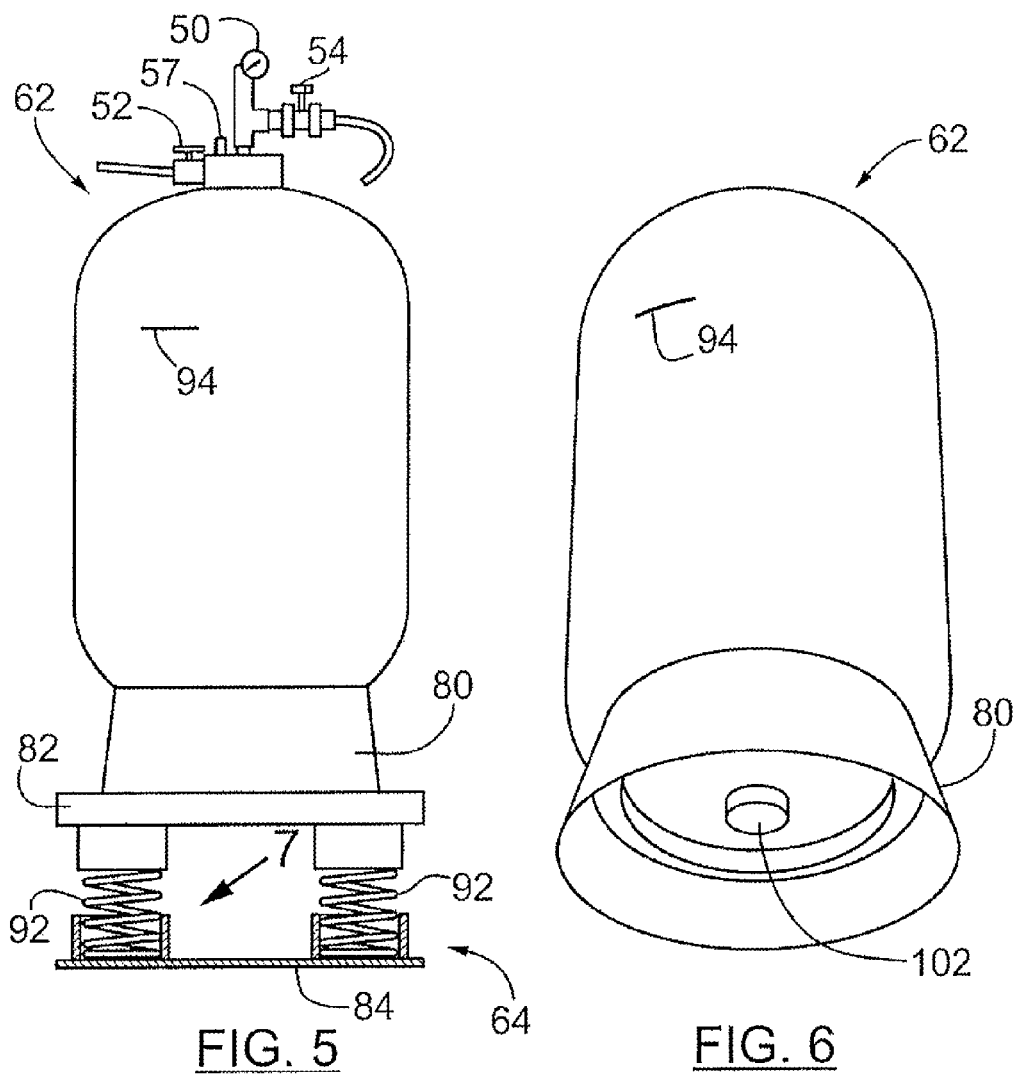
FIG. 5
FIG. 6
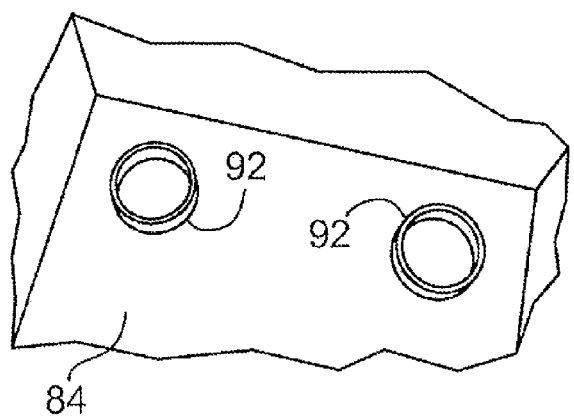
FIG. 7

POLYMER DELIVERY SYSTEM AND METHOD FOR WASTE WATER FACILITY

PRIOR APPLICATION

This application claims Convention priority on the basis of previously filed Canadian patent application no. 2,662,490 filed Apr. 15, 2009.

The present disclosure relates generally to polymer delivery systems and methods. More particularly, the present disclosure relates to a polymer delivery system for waste water facilities and polymer storage apparatus.

BACKGROUND

In some waste water treatment systems, polymer is mixed with water to prepare a water-polymer solution used to treat water in order to remove contaminants therefrom. However, problems have been encountered with previously used containers for providing this polymer to waste water facilities and also in connection with the systems used to introduce this polymer to dilution water.

Typically, the polymer is a viscous and hydrophilic composition. In some existing systems the polymer may interact with moisture and this can result in clogging within a flow line. This may result in loss of polymer at an injection suction pump site, or render it difficult to provide accurate polymer concentrations to mix with the waste water.

In some systems, the polymer creates buildup within the flow lines and pumps. The mere use of a suction pump may provide insufficient pressure to prevent such buildup within a system.

It would be advantageous to provide polymer delivery systems and methods which address at least some of the above-noted difficulties.

Example embodiments generally relate to containers or packages for delivery chemicals such as polymers and to systems for introducing and mixing polymer with water for waste water treatment systems.

In some example embodiments, there is generally provided systems and methods for activating polymer within a water treatment facility. The system includes a polymer makedown unit for blending and mixing diluent and polymer, the makedown unit facility including a polymer pump and a back pressure regulator operatively connected to the polymer pump. The system further includes a source of polymer including a sealed storage tank for the polymer capable of being pressurized with compressed gas. The container includes a chamber for storing polymer under pressure, and an outlet for outputting pressurized polymer to the polymer makedown unit.

SUMMARY OF THE DISCLOSURE

In one aspect, there is provided a method for operating a polymer makedown system comprising:
providing a first quantity of diluent via a pressurized source of diluent to a diluent-polymer mixing feeder unit of the makedown system; providing a polymer source in the form of a sealed container containing polymer, the container being enclosed, being capable of being pressurized by means of compressed gas, and having an inlet for compressed gas and an outlet for polymer; providing a pump for delivering the polymer to the feeder unit, an inlet of the pump being operatively connected by a polymer delivery line to the outlet of the container; delivering a predetermined quantity of polymer from the container to the pump by pressurizing the container with compressed gas and then delivering the predetermined quantity to the feeder unit; and mixing the first quantity of diluent with the predetermined quantity of polymer in the feeder unit to provide a desired polymer emulsion.

In another aspect, there is provided a system for activating polymer. The system includes a polymer makedown unit for blending and mixing diluent and polymer. The unit includes a diluent inlet for receiving diluent from a diluent source, a polymer solution outlet, a polymer pump having a polymer inlet and a pressurized polymer outlet, and a back pressure regulator operatively connected in a polymer feed line connected to the polymer outlet of the polymer pump. There is also provided a source of polymer including a sealed storage container for the polymer capable of being pressurized with compressed gas and a first delivery line coupling the storage container to the polymer inlet of the pump so as to enable flow of polymer under pressure to the pump. A second delivery line operatively couples a source of compressed gas to the container so that during use of the system, the second delivering line can deliver compressed gas to the container in order to pressurize same and thereby deliver a predetermined quantity of polymer to the polymer pump.

In yet another aspect, there is provided a polymer storage apparatus, which includes a sealable container having an exterior and a chamber for storing polymer under pressure. This container is capable of being pressurized by compressed gas and has both an inlet for the compressed gas and an outlet for polymer. At least one visual fill level marker is provided on the exterior of the container. The apparatus also has an outer frame having a base and vertically extending side walls connected to the base. The container is mounted in and supported by the frame both for transport purposes and for use of the apparatus at a polymer using facility. Coil spring means are mounted on the base of the frame for supporting the container on the base in a vertically movable manner so that the vertical position of the container and the at least one marker relative to the frame is dependent on the amount of polymer in the container. The frame has a fill level indicator provided thereon in the vicinity of the at least one fill level marker whereby a user of the apparatus is able to determine at least approximately the amount of polymer in the container by viewing the position of the at least one marker relative to the fill level indicator.

In yet another aspect, there is provided a polymer makedown unit including a mixing feeder unit for blending and mixing diluent and polymer having a diluent inlet for receiving diluent from a diluent source, a polymer inlet for receiving polymer, and a polymer solution outlet. The unit also has a polymer pump having a pump inlet and a pump outlet and a back pressure regulator operatively connected to the pump outlet and operatively connected to the polymer inlet of the mixing feeder. A delivery line is coupled to the pump inlet of the pump for delivery of pressurized polymer to the pump.

In yet another aspect, there is provided a polymer delivery apparatus for providing polymer to a polymer makedown unit, which includes a container having an exterior and a chamber for storing polymer under pressure, this container being capable of being pressurized by compressed gas. The apparatus also has an inlet for receiving the compressed gas into the chamber and an outlet coupled to a delivery line for transferring pressurized polymer from the chamber to the polymer makedown unit.

BRIEF DESCRIPTION OF THE FIGURES

Embodiments will now be described by way of example with reference to the accompanying drawings, in which like reference numerals are used to indicate similar features, and in which:

FIG. 5 is a side view of the tank of FIG. 4;

FIG. 6 is a perspective view of the tank of FIG. 4; and

FIG. 7 is a detail perspective view of a section of a base platform for the tank of FIG. 4.

DETAILED DESCRIPTION

Figure 1:
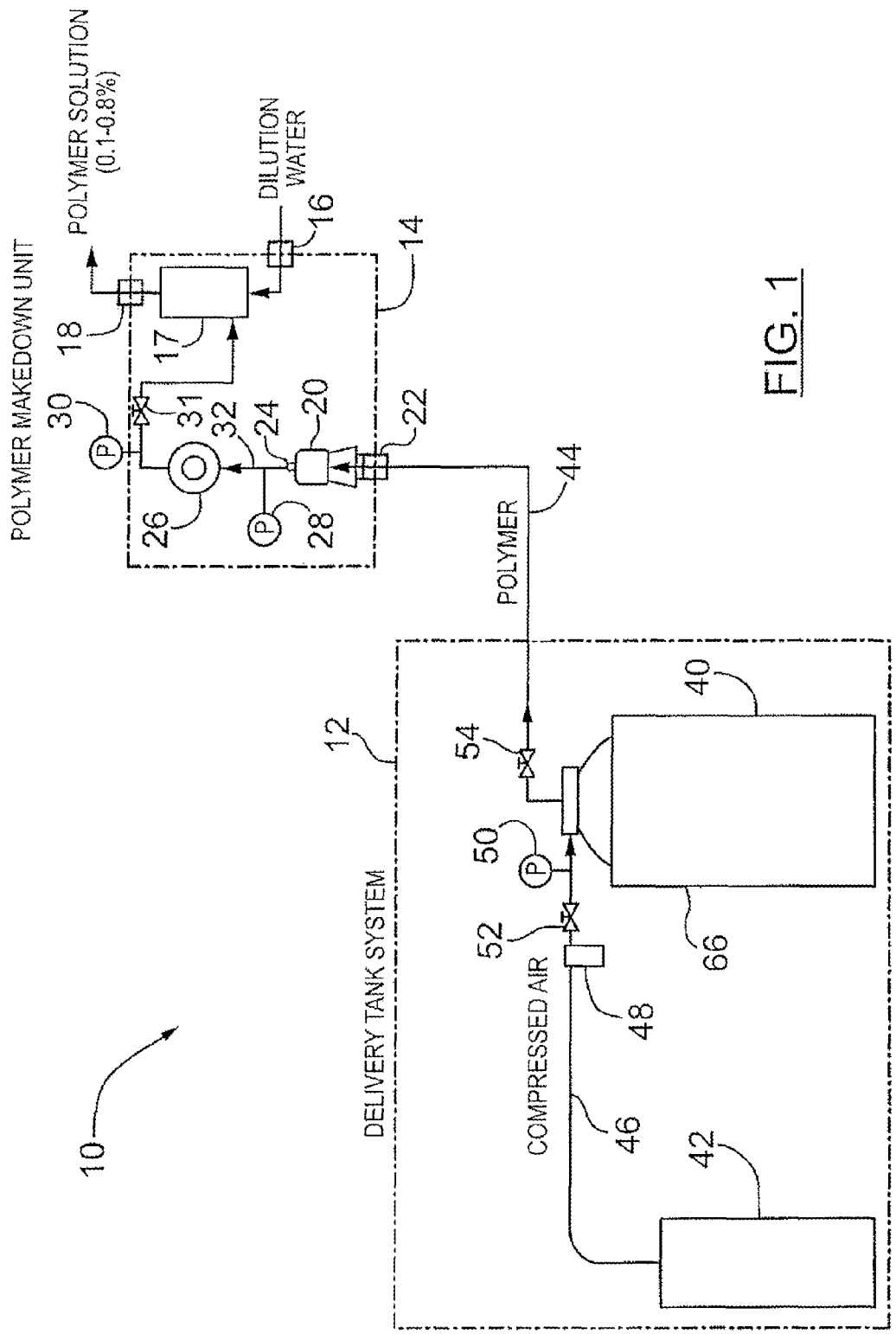
FIG. 1 is a diagrammatic illustration of a polymer delivery system in accordance with an example embodiment.

Reference is now made to FIG. 1, which shows a diagrammatic illustration of a polymer delivery system 10 incorporating the present invention. As shown, the polymer delivery system 10 includes a delivery tank system 12 which provides for delivery of chemicals such as polymers to a polymer makedown unit 14. The system 10 may for example comprise or form part of a water treatment facility. In the example shown, the delivery tank system 12 includes portable and modular components which may be readily detachable from the polymer makedown unit 14.

The polymer makedown unit 14 generally provides for blending and mixing diluent (e.g., dilution water, as shown in FIG. 1) and polymer. The makedown unit 14 includes a diluent inlet 16 for receiving diluent from a diluent source and delivering same to a diluent-polymer mixing feeder unit 17 for mixing of the diluent and polymer. Once mixed within the diluent-polymer mixing feeder unit 17, the polymer solution is delivered via a polymer solution outlet 18 to further systems (not shown) for treatment of waste water within a water treatment facility. The resultant polymer solution is typically selected to be from about 0.1 to about 0.8 per cent polymer. The specific configuration and operation of the diluent-polymer mixing feeder unit 17 is known in the art per se and is therefore not described in detail herein.

The polymer makedown unit 14 further includes a polymer pump 20 having a polymer inlet 22 and a pressurized polymer outlet 24. The polymer pump 20 may sometimes be referred to as an injection pump. The polymer pump 20 can for example be rated to pump up to about 105 p.s.i.

In some conventional makedown systems it is solely this polymer pump 20 that is used to deliver the polymer to the mixing feeder unit 17. In the illustrated embodiment, the makedown unit 14 further includes a back pressure regulator 26 for maintaining the pressure of the input polymer. The back pressure regulator 26 is located downstream of the polymer pump 20 and operatively connected using a polymer feed line 32 connected to the polymer outlet 24 of the pump 20. The back pressure regulator 26 can be set no higher than a maximum operating pressure for the feeder unit 17 and lower than the maximum operating pressure of the polymer pump 20. For example the back pressure regulator 26 is set lower than about 100 p.s.i.

In some example embodiments, an existing makedown unit 14 can be modified or retrofitted to include the back pressure regulator 26.

The polymer makedown unit 14 can further include two pressure gauges 28, 30 which enable a user of the system to obtain a visual check to confirm that the polymer delivery system 10 is working as designed. In other example embodiments, the pressure gauges 28, 30 can include digital gauges which are input into a suitable computer device or display device. There is also a shut-off or throttle valve 31 downstream of the back pressure regulator 26.

The delivery tank system 12 includes a tank structure 40 and a compressed gas supply 42. The delivery tank system 12 generally supplies polymer to the polymer makedown unit 14 from a source of polymer stored within a container 62 of the tank structure 40. A delivery line 44 operably couples the tank or container 62 to the polymer inlet 22 of the pump 20 so as to enable flow of polymer under pressure to the pump 20. A second delivery line 46 operatively couples the compressed gas supply 42 to the container 62 so that during use of the delivery tank system 12 system, the second delivering line 46 can deliver compressed gas to the container 62 in order to pressurize same and thereby deliver a predetermined quantity of polymer to the polymer pump 20. A desiccant filter unit 48 is connected to the second delivery line 46 for removing moisture from the compressed gas, resulting in dry compressed gas. This for example reduces or eliminates moisture being inadvertently applied to the polymer within the container 62 and delivery line 44. It can be appreciated that this substantially reduces the possibility of clogging within the feed lines and pump of the system 10.

The delivery tank system 12 can further include another pressure gauge 50 coupled to a T-shaped pipe connector 51 for verification of the operating pressure of the polymer. The bottom end of the connector 51 is threadably connected to the top of a draw pipe 72 (see FIG. 4). There can be shut-off or throttle valves 52, 54 to control the flow of pressurized air and polymer respectively.

Figure 2:
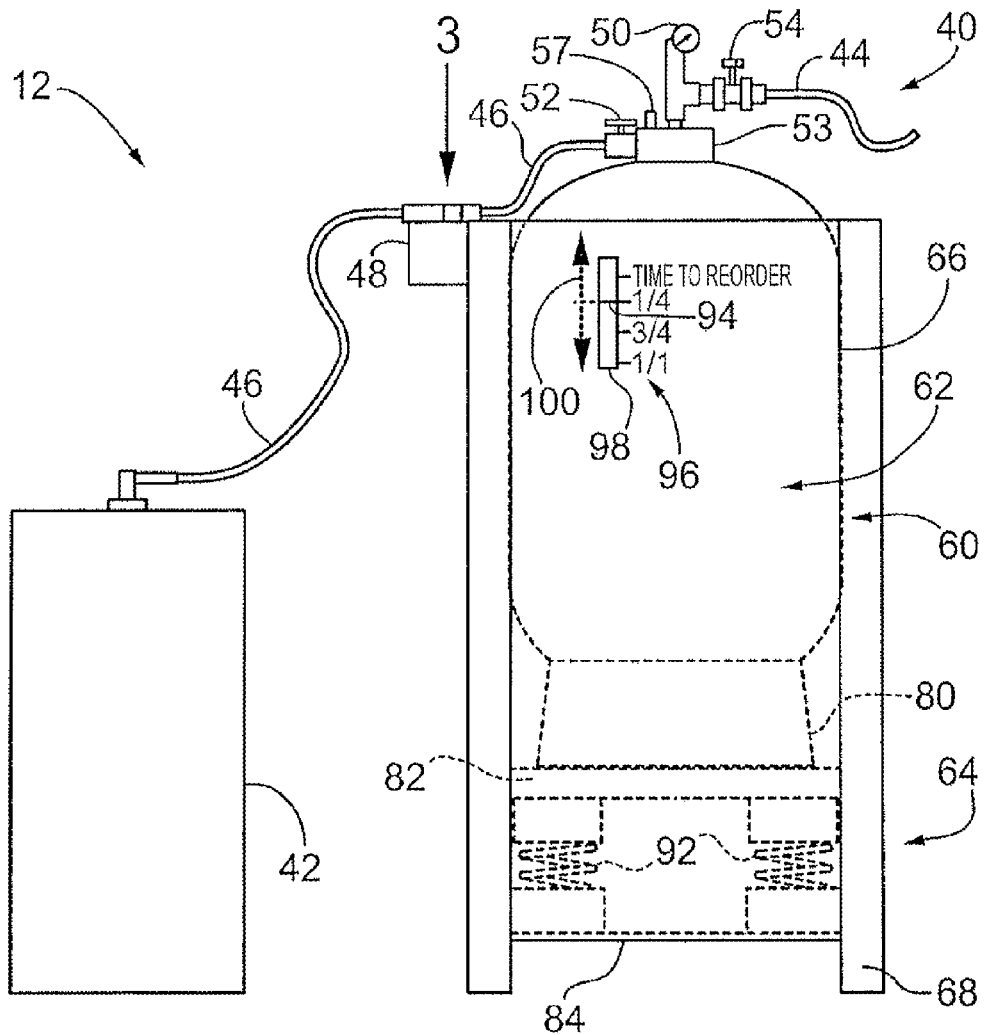
FIG. 2 is a side view of a delivery tank system to be used in the system of FIG. 1.
Figure 3:
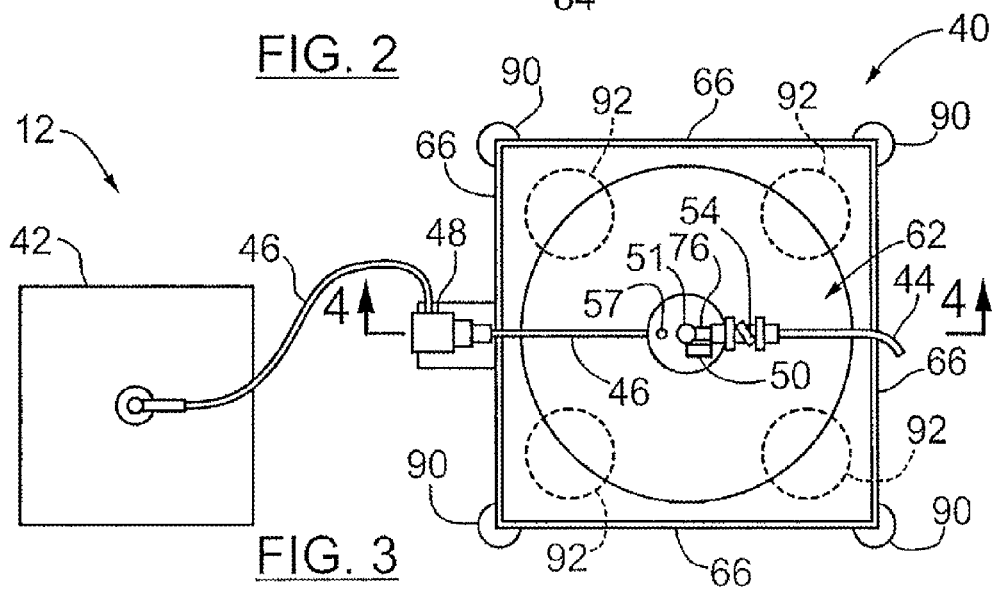
FIG. 3 is a top view of the delivery tank system of FIG. 2.

Reference is now made to FIGS. 2 to 7, which show the delivery tank system 12 in greater detail. Referring now to FIGS. 2 and 3, the tank 40 includes an outer frame or outer container 60 and a polymer container 62. The polymer container 62 is both pressurized and sealed with respect to the surrounding environment. The polymer container 62 is rated to withstand pressure under operation and, for example can be formed of fibreglass reinforced plastic, such as fiberglass reinforced polyethylene. For example, the polymer container 62 can be rated to withstand a pressure of at least 50 p.s.i. and preferably at least 100 p.s.i. The polymer container 62 in one embodiment has a polymer storage capacity of at least 50 imperial gallons and in one particular version, the container has a capacity of 61 gallons (231 liters) and weighs as much as 540 lbs. when full.

Figure 4:
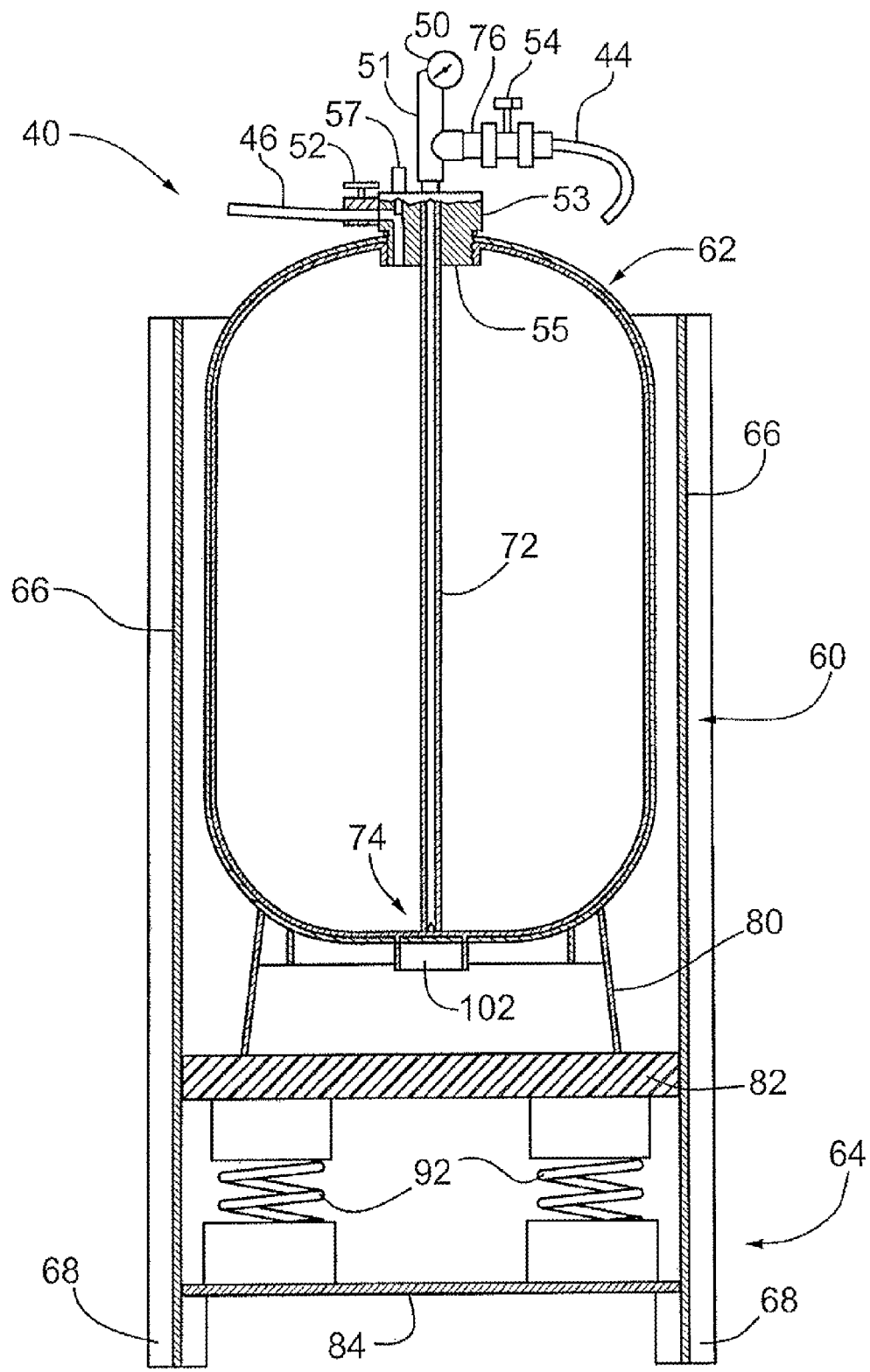
FIG. 4 is a vertical sectional view of a tank to be used in the delivery tank system, this view taken along line 4-4 of FIG. 3.

Referring now to FIG. 4, as shown, the polymer container 62 includes an inlet (to which the line 46 is attached) for receiving compressed gas and injecting this into an upper portion of the interior of the container 62. The container 62 further includes the vertically extending draw pipe 72 that extends generally from adjacent a bottom end of the container 62 to the top of the container 62. One version of this pipe has an O.D. of ¾ inch. Upon force of the compressed gas at the top of the container, polymer is pushed from above and to an opening at a bottom 74 of the draw pipe 72. The polymer is thus pushed back up, through the draw pipe 72, and through the T-connector 51 and an outlet 76 that extends from the T-connector. A cylindrical cap 53 is operably coupled to a top of the container 62 and the drain pipe extends through the cap in order to delivery the polymer to the delivery line 44. The cap can be detachably connected by threads formed about a bottom section 55 of the cap. The joint between the cap and threaded opening in the top of the container is sealed by an annular seal. In one embodiment, the top opening has a diameter of 4.5 inches. The delivery line 44 is also connected to the outlet 76. Note that the polymer is also "pulled" by the polymer pump 20 of the makedown unit 14. Mounted on the cap 53 is a pressure relief valve 57 of standard construction. The valve 57 can be set at 25 p.s.i., well below the maximum design pressure of the container.

The bottom 74 of the draw pipe 72 can include one or more openings in order to facilitate passage of the polymer therethrough. For example, the bottom 74 can include a central wedge-shaped cut, as shown in FIG. 4. In other example embodiments, the bottom 74 may be biased (cut at an angle). In other example embodiments, the bottom 74 includes a plurality of holes or perforations defined therein, for example aligned in a vertical row.

As best shown in FIG. 6, the container 62 has an annular upwardly tapered tank support 80 for supporting the container 62 which has a rounded bottom end. The support 80 can be made of fibreglass. A permanently sealed cap 102 is shown which covers an initial entry feed point for the polymer (typically filled at the manufacturer level).

Referring now to FIG. 4, the outer frame 60 has the polymer container 62 mounted therein for transport and for use at a water treatment facility. The frame includes a base platform 64 for supporting the polymer container 62. The frame 60 further includes four generally vertically extending, rectangular sidewalls 66 forming a rectangular box with an open top and connected to the base platform 64. As shown, the sidewalls 66 can be generally unbroken plastic panels. The frame 60 can be formed of non-corrosive, lightweight, and rigid material. Suitable materials include plastic materials such as polyethylene. As best shown in FIG. 3, the sidewalls 66 are connected using elongate plastic corner members 90 joining adjacent panel edges. The elongate plastic corner members 90 can for example be made of elongate three quarter sections cut from ABS (Acrylonitrile-Butadiene-Styrene) pipe and are bonded to the sidewalls 66 using polyethylene.

Referring again to FIG. 4, a bottom 84 of the frame 60 is elevated by four legs or supports 68 formed by bottom end sections of the corner members 90. These legs create a bottom space enabling the frame 60 with the container 62 to be lifted and moved with a forklift truck or pallet jack.

An indicator system will now be described. This system can be used to indicate approximately the amount of polymer in the polymer container 62, and when the container 62 and/or the polymer contained therein are to be replaced. Referring to FIG. 5, the base platform 64 includes a support plate 82 having a generally planar top on which the container 62 is mounted or merely placed atop using gravity. As shown in FIG. 5, the base platform 64 further includes coil spring means which include a plurality of coil springs 92 extending vertically between the bottom 84 of the frame 60 and the moveable support plate 82. The illustrated base platform has four springs 92. In other example embodiments, the support for the container can be any suitable biasing member or resilient member that can support the weight of the container.

Referring still to FIG. 5, one or more markers 94 (one shown) are provided on the exterior of the polymer container 62 as part of the indicator system. Referring now to FIG. 2, the plurality of coil springs 92 support the weight of the container 62 and any polymer contained therein. A fill level indicator 96 may be provided on one of the sidewalls 66, including a window 98 generally corresponding to the location of the marker 94 of the container 62. It will be appreciated that the coil springs 92 are fully compressed (by as much as 6 inches) when the container 62 is full of polymer. However, as the container 62 is emptied the coil springs 92 raise up the container 62 relative to the frame 60 and by the use of the fill level indictor 96, a system operator can determine the fullness or emptiness of the container 62. Motion arrow 100 illustrates the range of motion of the container 62. Each facility can have its own rate of use of the polymer and therefore there can be pre-selection or pre-calibration of the location of the markings 94 and fill level indicator 96. In other example embodiments, a fill level indicator is not used but another reference point can be used, such as the top of the frame 60 (e.g. the container 62 requires filling when a marker becomes visible to the operator at the top of the frame 60). Thus, such an indicator system can allow a user to determine at least approximately the amount of polymer in the container 62 tank by viewing the position of the marker 94 relative to the fill level indicator 96. In the example shown in FIG. 2, the fill level indicator 96 includes the indicators of full (1/1), three-quarters full (3/4), one-quarter full (1/4), and empty ("Time to Reorder"). In the example shown in FIG. 2, the marker 94 indicates that the container 62 is one-quarter full (1/4).

Referring again to FIG. 2, the desiccant filter unit 48 may include a membrane therein (not shown) for filtering of moisture and water vapours, as is known in the art. In some example embodiments, other types of water or moisture removing filter or device can be used instead of the filter unit 48.

Referring again to FIG. 1, in some example embodiments the compressed gas supply 42 may be any source of compressed gas. For example, the compressed gas supply 42 may be provided by a motor-driven compressor or compressor system capable of providing compressed gas or air. In one exemplary version the compressor is driven by an electric motor (not shown). It can be appreciated that many water treatment facilities already use compressors of this type for other purposes. In other example embodiments, a portable compressed gas container may be used. The particular choice of compressed gas depends on the particular application, but generally requires a relatively inert, dry gas. Examples of suitable gases include but are not limited to air and nitrogen. Air has the distinct advantage of being free and easily available.

The specific type of polymer is selected based on the particular application, as would be known by those skilled in the art. The polymer is typically in a liquid form. Examples of suitable polymers include but are not limited to WOAF PM-03 anionic flocculant, available from The Klenzoid Company Limited of Mississauga, Ontario.

The various embodiments presented above are merely examples and are in no way meant to limit the scope of this disclosure. Variations of the innovations described herein will be apparent to persons of ordinary skill in the art, in particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art.

What is claimed is:

1. A polymer storage apparatus comprising:
   a sealable container having an exterior, a polyethylene lining, and a chamber containing polymer in liquid form under pressure,
   said container being capable of being pressurized by compressed gas and having both an inlet for said compressed gas and a separate outlet for said polymer, at least one line marker being provided on said exterior of the container;
   an outer frame having a base and vertically extending side walls connected to said base, said container being mounted in and supported by said frame both for transport purposes and for use of the apparatus at a polymer using facility;

a coil spring mechanism mounted on said base of the frame for supporting said container on said base in a vertically movable manner so that the vertical position of said container and said at least one marker relative to said frame is dependent on an amount of said polymer in said container; and a fill level indicator provided on said frame corresponding to a location of said at least one line marker on the exterior of the container, said line marker being visible through said fill level indicator and moving relative to the fill level indicator on the frame in dependence on the amount of said polymer in liquid form in said container.

2. A polymer storage apparatus according to claim 1 including an annular container support for supporting said container which has a rounded bottom end, and further including a support plate having a planar top on which said annular container support is mounted, wherein said coil spring mechanism comprises a plurality of coil springs extending vertically between said base and said support plate.

3. A polymer storage apparatus according to claim 1 wherein said side walls comprise four, substantially unbroken plastic side panels with elongate plastic corner members joining adjacent panel edges.

4. A polymer storage apparatus according to claim 1 wherein said container has a fiberglass exterior and is rated to withstand an internal pressure of at least 100 p.s.i.

5. A polymer storage apparatus according to claim 1 wherein said container has a polymer storage capacity of at least 50 imperial gallons and said inlet and outlet are located at an upper end of said container.

6. A polymer storage apparatus according to claim 3 wherein said plastic corner members are made of elongate quarter sections cut from ABS (Acrylonitrile-Butadiene-Styrene) pipe and are bonded to the side panels using polyethylene.

* * * * *